(12) United States Patent
Nakao et al.

(10) Patent No.: US 7,428,201 B2
(45) Date of Patent: Sep. 23, 2008

(54) OPTICAL DISC DEVICE, OPTICAL PICKUP CONTROL METHOD AND OPTICAL DISC DISCRIMINATING METHOD

(75) Inventors: Takashi Nakao, Saitama (JP); Noriaki Nishi, Kanagawa (JP)

(73) Assignee: Sony Corporation, Tokyo (JP)

( * ) Notice: Subject to any disclaimer, the term of this patent is extended or adjusted under 35 U.S.C. 154(b) by 365 days.

(21) Appl. No.: 10/569,370

(22) PCT Filed: Jul. 11, 2005

(86) PCT No.: PCT/JP2005/012790

§ 371 (c)(1),
(2), (4) Date: Feb. 24, 2006

(87) PCT Pub. No.: WO2006/006572

PCT Pub. Date: Jan. 19, 2006

(65) Prior Publication Data

US 2007/0008853 A1  Jan. 11, 2007

(30) Foreign Application Priority Data

Jul. 13, 2004 (JP) ............................. 2004-206293

(51) Int. Cl.
*G11B 7/00* (2006.01)
(52) U.S. Cl. ..................... 369/53.22; 369/94
(58) Field of Classification Search ............... 369/53.21, 369/53.22, 53.23, 47.5, 94
See application file for complete search history.

(56) References Cited

U.S. PATENT DOCUMENTS 6,940,794 B2 *  9/2005  Hayashi ................. 369/47.5

FOREIGN PATENT DOCUMENTS

| JP | 3-113837 | 5/1991 |
|----|----------|--------|
| JP | 8-185635 | 7/1996 |
| JP | 9-259456 | 10/1997 |
| JP | 11-353787 | 12/1999 |
| JP | 2005-025923 | 1/2005 |

* cited by examiner

*Primary Examiner*—Nabil Z Hindi
(74) *Attorney, Agent, or Firm*—Oblon, Spivak, McClelland, Maier & Neustadt, P.C.

(57) ABSTRACT

In the present invention, an optical pick-up (4) applies an optical beam to an optical disc (2) on which one or more information recording layers (20A) and (20B) are laminated in the direction of thickness through an objective lens (34) and detects a reflected light from one of the information recording layers laminated on the optical disc. A first photodetecting part (81) for detecting the reflected light from the one information recording layer and a second photodetecting part (82) composed of one or more light receiving surfaces for detecting a stray light from other information recording layers are mounted on a light receiving element (52). The number of the information recording layers laminated on the optical disc (2) is discriminated on the basis of the intensity of the stray light detected by the second photodetecting part (82). The optical pick-up (4) is controlled in accordance with the discriminated number of the information recording layers before a focus is controlled.

20 Claims, 7 Drawing Sheets

OPTICAL DISC DEVICE, OPTICAL PICKUP CONTROL METHOD AND OPTICAL DISC DISCRIMINATING METHOD

TECHNICAL FIELD

The present invention relates to an optical disc as an optical recording medium, and more particularly to an optical disc apparatus having an optical pick-up that applies an optical beam to the optical disc on which a plurality of information recording layers are formed through an objective lens and detects a reflected light from any one of the plurality of information recording layers, a control method for the optical pick-up and a discriminating method for the optical disc.

The present application claims a priority based on Japanese Patent Application No. 2004-206293 filed on Jul. 13, 2004 and the Japanese Patent Application is applied to the present application by referring thereto.

BACKGROUND ART

An optical pick-up that writes or reads an information signal on the optical recording medium such as the optical disc has been hitherto employed. The optical pick-up of this type has a light source such as a semiconductor laser to irradiate the optical recording medium with an optical beam emitted from the light source through an objective lens. Then, the information signal is written in the optical recording medium by the optical beam with which the optical recording medium is irradiated, or the reflected light of the optical beam applied to the optical recording medium is detected to read the information signal. One example of this kind of optical pick-up is disclosed in Japanese Patent Application Laid-open No. 2001-110068.

In recent years, to increase the storage capacity of the optical recording medium on which the information signal is recorded, a multi-layer optical disc has been proposed in which information recording layers for storing information are laminated in multi-layers in the direction of the thickness of the recording medium. When the information signal is recorded or reproduced on the multi-layer optical disc by the above-described optical pick-up, the condensing point of the optical beam by the objective lens can be made to exist on each information recording layer.

In such multi-layer optical discs, reflecting characteristics are different depending on the number of the information recording layers. Accordingly, when the information signal recorded on the information recording layer is recorded or reproduced by using the optical pick-up, various kinds of settings are required, for instance, an optical output is changed depending on what number of layers the information recording layer is piled. Specifically, a two-layer disc needs a recording and reproducing power about two times as high as that of one-layer disc. Likewise, three and four-layer discs need the recording and reproducing power not lower than the above-described power. Further, a case may be arise in which an amount of spherical aberration on a signal recording surface needs to have a satisfactory value by changing an amount of spherical aberration of light outputted from the optical pick-up in accordance with the thickness of a cover layer changing depending on the number of layers of the information recording layers.

Further, in a compatible optical disc apparatus in which already practically used DVD (Digital Versatile Disc) and CD (Compact Disc) can be selectively employed, when the kind of the optical disc to be mounted on the apparatus is discriminated, a complicated discriminating work is necessary. What is called a Blue Ray Disc (BD) as the optical disc that uses, in future, a blue color laser having wavelength shorter than that of the usually employed optical beam for recording and reproducing operations needs to discriminate discs more rapidly, as corresponding formats more increase.

When the information signal is recorded on the optical recording medium or the information signal recorded on the optical recording medium is reproduced by the optical disc apparatus having the optical pick-up as described above, if it is discriminated which of the optical discs including a BD, a DVD, a CD, etc. the optical recording medium is on which the information signal is tried to be recorded or reproduced at the present time, and whether the optical recording medium has a single information recording layer or a plurality of information recording layers, the reading operation of a discriminating signal recorded on the optical recording medium needs to be repeated. Further, the setting of the optical pick-up needs to be changed in accordance with whether or not the signal can be read, which of kinds of formats, for instance, ROM, ±R, ±RW, RAM, RE, etc. the kind of a format of the optical recording medium is, or what number of information recording layers are laminated from the read discriminating signal. Consequently, a great time loss is supposed to arise until a recording or a reproducing process is started.

When such a discriminating signal is read, there sometimes occurs a case that the wavelength or the intensity of light of the optical beam emitted from the light source of the optical pick-up cannot be set to a wavelength and an intensity of light necessary for performing an optimum recording and reproducing process, so that they need to be reset many times. Thus, when the recording and reproducing process is started, an operation is undesirably unstable.

DISCLOSURE OF THE INVENTION

Problems to be Solved by the Invention

Thus, the present invention is proposed by considering the above-described technical problems and it is an object of the present invention to provide an optical disc apparatus and a control method for an optical pick-up that can start a recording and reproducing process in a more stable way by rapidly setting an optical beam emitted from a light source to a wavelength and an intensity of light necessary for performing an optimum recording and reproducing process, and a disc discriminating method using the optical disc apparatus and the control method for the optical pick-up.

Accordingly, the present invention has an object to overcome the above-mentioned drawbacks of the prior art by providing an optical disc apparatus having an optical pick-up that applies an optical beam to an optical disc on which one or more information recording layers are laminated in the direction of thickness through an objective lens and detects a reflected light from one of the information recording layers laminated on the optical disc, the optical disc apparatus including a photodetecting unit having a first photodetecting part for detecting the reflected light from the one information recording layer and a second photodetecting part composed of one or more light receiving surfaces for detecting whether or not there is a stray light from other information recording layers and the quantity of light thereof, and a control unit for discriminating the number of the information recording layers laminated on the optical disc on the basis of the intensity of the stray light and/or the distribution of the intensity detected by the second photodetecting part in the photodetecting unit and changing the setting of the optical pick-up in accordance with the discriminated number of the information recording layers, wherein the control unit discriminates the kind of the optical disc on the basis of the presence or absence of the stray light from other information recording layers detected by the second photodetecting part in the photodetecting unit and the quantity of light thereof.

According to the present invention, there is also provided a control method for an optical pick-up that applies an optical beam to an optical disc on which one or more information recording layers are laminated in the direction of thickness through an objective lens and detects a reflected light from one of the information recording layers laminated on the optical disc, the control method including the steps of detecting whether or not there is a stray light and the quantity of light thereof by a light receiving element including a first photodetecting part for detecting the reflected light from the one information recording layer and a second photodetecting part composed of one or more light receiving surfaces for detecting whether or not there is the stray light from other information recording layers and the quantity of light thereof, discriminating the number of the information recording layers laminated on the optical disc on the basis of the intensity of the stray light and/or the distribution of the intensity detected by the second photodetecting part in the photodetecting unit, changing the setting of the optical pick-up in accordance with the discriminated number of the information recording layers, and discriminating the kind of the optical disc on the basis of the presence or absence of the stray light from other information recording layers detected by the second photodetecting part in the photodetecting unit and the quantity of light thereof.

According to the present invention, there is also provided a discriminating method for an optical disc in which an optical beam is applied to an optical disc on which one or more information recording layers are laminated in the direction of thickness through an objective lens and a reflected light from one of the information recording layers laminated on the optical disc is detected to discriminate the kind of the optical disc, the discriminating method including the steps of detecting whether or not there is a stray light and the quantity of light thereof by a light receiving element including a first photodetecting part for detecting the reflected light from the one information recording layer and a second photodetecting part composed of one or more light receiving surfaces for detecting whether or not there is the stray light from other information recording layers and the quantity of light thereof, discriminating the number of the information recording layers laminated on the optical disc on the basis of the intensity of the stray light and/or the distribution of the intensity detected by the second photodetecting part in the photodetecting unit, changing the setting of the optical pick-up in accordance with the discriminated number of the information recording layers, and discriminating the kind of the optical disc on the basis of the presence or absence of the stray light from other information recording layers detected by the second photodetecting part in the photodetecting unit and the quantity of light thereof.

In the present invention, the second photodetecting part composed of one or more light receiving surfaces for detecting the stray light from other information recording layers is mounted on the light receiving element in addition to the first photodetecting part for detecting the reflected light from the one information recording layer. The number of the information recording layers laminated on the optical disc is discriminated on the basis of the intensity of the stray light and/or the distribution of the intensity detected by the second photodetecting part. The setting of the optical pick-up is changed in accordance with the discriminated number of the information recording layers. The kind of the optical disc is discriminated on the basis of the presence or absence of the stray light from other information recording layers detected by the second photodetecting part in the photodetecting unit and the quantity of light thereof.

Therefore, in the present invention, the number of the information recording layers can be extremely rapidly and easily discriminated, and accordingly, a recording and reproducing operation can be started in a more stable condition.

Still another objects of the present invention and specific advantages achieved by the present invention will be more apparent from embodiments described below by referring to the drawings.

BEST MODE FOR CARRYING OUT THE INVENTION

Now, an embodiment applied to an optical disc apparatus on which an optical pick-up is mounted for detecting a reflected light from one information recording layer of a plurality of information recording layers formed on an optical disc will be described below in detail by referring to the drawings.

Figure 1:
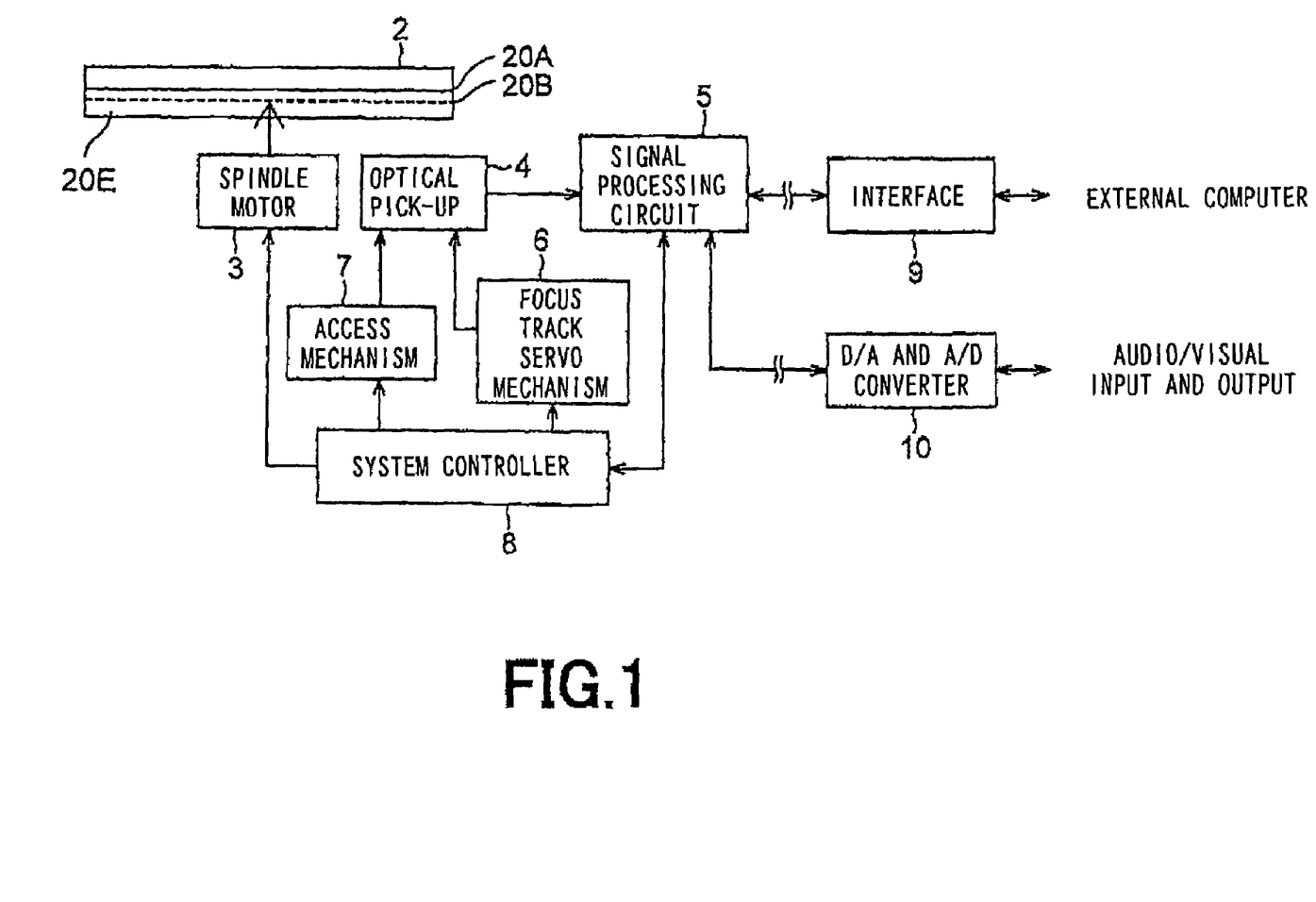
FIG. 1 is a block diagram showing one example of an optical disc apparatus to which the present invention is applied.

The optical disc apparatus 1 to which the present invention is applied is a recording and reproducing apparatus in which an information signal can be recorded or reproduced on an optical disc 2 on which a plurality of information recording layers are laminated in the direction of thickness, for instance, a Blue Ray Disc as the optical disc using a blue laser beam for recording and reproducing operations. As shown in FIG. 1, the optical disc apparatus includes a spindle motor 3 for driving to rotate the optical disc 2 and an optical pick-up 4 that applies an optical beam on a recording surface of the optical disc 2 and detects a return light reflected from the recording surface of the optical disc 2. The optical disc apparatus further includes a signal processing circuit 5 for generating a reproducing signal and a control signal in accordance with the return light detected by the optical pick-up 4, a focus and track servo mechanism 6 for performing a focusing control for controlling the optical beam to focus on the signal recording surface of the optical disc 2 on the basis of the control signal and a tracking control for controlling the optical beam to follow a recording track formed on the optical disc 2, an access mechanism 7 for moving the optical pick-up 4 to a prescribed track of the optical disc 2 and a system controller 8 for controlling the spindle motor 3, the focus track servo mechanism 6 and the access mechanism 7 in accordance with the signals generated in the signal processing circuit 5.

The optical disc 2 has one or more information recording layers laminated in the direction of thickness. In the optical disc 2, when the information recording layers are laminated over two layers in the direction of thickness, an information recording layer 20A formed on a main surface of a base of the disc and an information recording layer 20B formed on the information recording layer 20A are sequentially laminated, and further, a protective layer 20E for protecting the information recording layer 20B is formed.

The spindle motor 3 is controlled and driven by the system controller 8 to rotate the optical disc 2 under a constant linear velocity or a constant angular velocity.

The optical pick-up 4 applies the optical beam on the information recording layer 20A (20B) of the optical disc 2 rotated and operated by driving the spindle motor 3, and detects the return light reflected by the information recording layer 20A (20B) of the optical disc 2 and outputs the return light to the signal processing circuit 5. At this time, the optical pick-up 4 outputs the optical beam of an optimum light output in accordance with the number of the information recording layers laminated on the optical disc 2 rotated and operated under the control by the system controller 8.

The signal processing circuit 5 demodulates, during a reproduction, the reproducing signal and the control signal obtained in accordance with the return light detected by the optical pick-up 4 and corrects an error. The signal processing circuit 5 adds, during a recording operation, peculiar header information or the header information of an extended file by, for instance, a time division multiplexing to a recording signal inputted from an interface 9. Further, the signal processing circuit 5 compresses and encodes the recording signal during the recording operation and adds an error correction code to the signal.

When the reproducing signal demodulated and error-corrected by the signal processing circuit 5 is used for storage of data in a computer, the reproducing signal is transmitted to an external computer through the interface 9. When the reproducing signal is used for audio/visual, the reproducing signal is digital/analog converted in a D/A converting part of a D/A and A/D converter 10 and transmitted to an audio/visual device.

Various kinds of control signals demodulated by the signal processing circuit 5 are outputted to the system controller 8. The system controller 8 drives the focus track servo mechanism 6 in accordance with a focus error signal and a tracking error signal. The focus track servo mechanism 6 moves and displaces an objective lens provided in the optical pick-up 4, under the control of the system controller 8, in biaxial directions of a direction where the objective lens is allowed to come close to or separate from the optical disc 2 in the direction of its optical axis, and a planar direction intersecting at right angles to the direction of the optical axis. Thus, the focus servo mechanism 6 performs the focusing control and the tracking control for controlling the optical beam to focus on the signal recording surface of the optical disc 2 and to follow the recording track formed on the optical disc 2.

Further, the access mechanism 7 feeds the optical pick-up 4 in the radial direction of the optical disc 2 in accordance with a signal supplied from the system controller 8 so that the optical pick-up 4 is located on a prescribed recording track of the optical disc 2.

Figure 2:
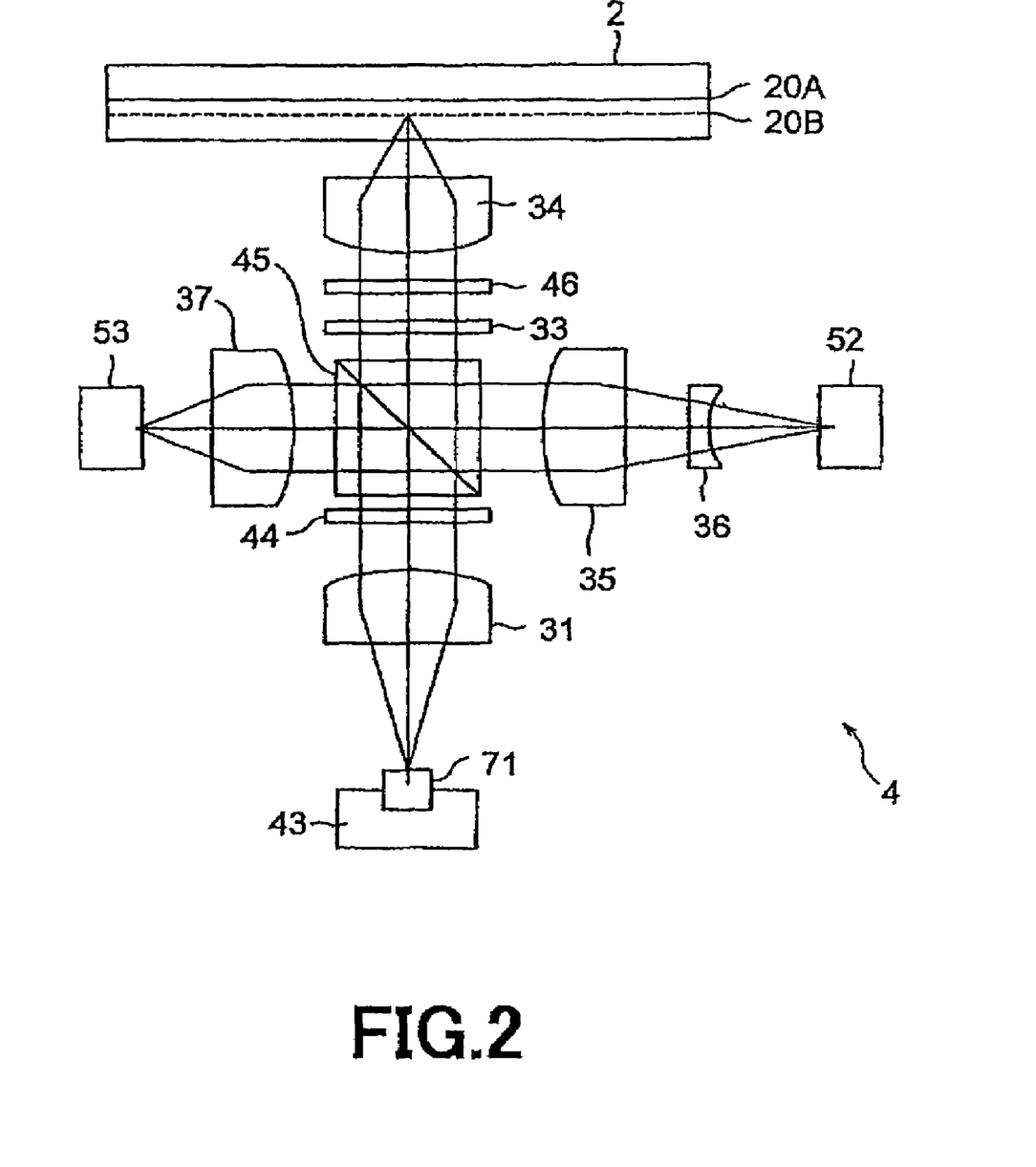
FIG. 2 is a side view showing an optical pick-up to which the present invention is applied.

Now, the structure of the optical pick-up 4 to which the present invention is applied will be described by referring to FIG. 2.

The optical pick-up 4 includes a semiconductor laser 71, a holder 43 for supporting the semiconductor laser 71, a collimator lens 31 for forming the optical beam outputted from the semiconductor laser 71 into parallel lights, a diffraction grating 44 for dividing the optical beam formed into the parallel lights by the collimator lens 31 into a plurality of parts, a polarized beam splitter 45 disposed in the optical path of the optical beam penetrating the diffraction grating 44, a liquid crystal element 33 for satisfactorily correcting a spherical aberration relative to the information recording layer 20A (20B) on which the optical beam penetrating the polarized beam splitter 45 tries to focus, a ¼ wavelength plate 46 disposed in the optical path of the optical beam penetrating the polarized beam splitter 45 and an objective lens 34 for condensing the optical beam penetrating the ¼ wavelength plate 46 to the information recording layer 20A (20B) of the optical disc 2. The optical pick-up 4 further includes a first condensing lens 35 and a cylindrical lens 36 for condensing the return light that is reflected from the information recording layer 20A (20B), penetrates again the objective lens 34, the ¼ wavelength plate 46 and the liquid crystal element 33 and is reflected by the polarized beam splitter 45, a first light receiving element 52 for receiving the optical beam penetrating the cylindrical lens 36, a second condensing lens 37 for condensing the optical beam outputted from the semiconductor laser 71 and reflected from the polarized beam splitter 45 and a second light receiving element 53 for detecting the intensity of the optical beam penetrating the second condensing lens 37.

To the holder 43, the semiconductor laser 71 is attached for outputting the laser beam having a prescribed wavelength. The semiconductor laser 71 is a light emitting element using the recombination radiation of a semiconductor.

Here, when as a recording medium of the optical disc apparatus 1, the Blue Ray Disc is employed as the optical disc 2 using the optical beam having the wavelength of 405 nm for recording and reproducing operations, for the semiconductor laser 71, a blue color semiconductor laser outputting the optical beam having the wavelength of 405 nm is used as a light source.

The optical beam outputted from the semiconductor laser 71 as a diffused light is incident on the collimator lens 31 to become parallel optical beams and the optical beams are incident on the diffraction grating 44. The semiconductor laser 71 controls the output of the optical beam to be outputted in accordance with the control of the system controller 8.

The diffraction grating 44 diffracts the optical beam outputted from the semiconductor laser 71 to divide the optical beam into a plurality of optical beams including three optical beams of a zero-order light and ± first-order lights. The optical beams divided by the diffraction grating 44 are incident on the polarized beam splitter 45.

The polarized beam splitter 45 transmits, for instance, an S polarized component of the S polarized component and a P polarized component of the optical beam outputted from the semiconductor laser 71 and guides the S polarized component to the liquid crystal element 33, and reflects the P polarized component in the prescribed ratio and guides the p polarized component to the second condensing lens 37. The polarized beam splitter 45 reflects the return light reflected by the optical disc 2 and guides the return light to the first condensing lens 35. The polarized beam splitter 45 may be constructed as a non-polarized beam splitter having no dependence on polarization. The optical beam as the parallel lights penetrating the polarized beam splitter 45 the spherical aberration of which is corrected by the liquid crystal element 33 is inputted to the ¼ wavelength plate 46.

The ¼ wavelength plate 46 gives a phase difference of $\pi/2$ to the penetrating optical beam. A linearly polarized optical beam outputted from the semiconductor laser 71 penetrates the ¼ wavelength plate 46 to become a circularly polarized beam. Further, when the circularly polarized optical beam reflected on the optical disc 2 penetrates the ¼ wavelength plate 46, the circularly polarized optical beam is changed to the linearly polarized beam.

The objective lens 34 is disposed in the optical path of the optical beam penetrating the ¼ wavelength plate 46 to condense the optical beam. For instance, as shown in FIG. 2, the objective lens 34 has a function for applying the optical beam on the information recording layer 20A (20B) of two layers formed on the optical disc 2. When the blue color semiconductor laser is used as the semiconductor laser 71, the optical disc 2 is irradiated with the blue laser beam through the objective lens 34. The objective lens 34 is supported so as to be movable in a focusing direction in which the objective lens comes close to or separates from the optical disc 2 in parallel with its optical axis and in a tracking direction in a planar direction intersecting at right angles to the optical axis by a biaxial actuator not shown in the drawing. The objective lens 34 is driven by the biaxial actuator in accordance with the focus error signal and the tracking error signal obtained by detecting the return light from the optical disc 2 to be moved in the focusing direction and the tracking direction. Thus, the focusing control is performed for controlling the optical beam to focus on any one of information recording layers 20A (20B) and the tracking control is also performed for controlling the optical beam to follow he recording track of the optical disc 2.

The return light reflected and returning from the information recording layer 20A (20B) of the optical disc 2 penetrates the objective lens 34 to become parallel lights. The parallel lights penetrate the ¼ wavelength plate 46 to become linearly polarized beams. The linearly polarized beams are directly reflected by the polarized beam splitter 45. Then, in the return light reflected by the polarized beam splitter 45, its size and form are shaped by the first condensing lens 35 and the cylindrical lens 36 and a beam spot is incident on the first light receiving element 52.

The first light receiving element 52 receives and photoelectrically transfers the return light to generate a reproducing signal and transmits the reproducing signal to the signal processing circuit 5. Further, the first light receiving element 52 receives the optical beam in which an astigmatism is generated by the cylindrical lens 36 and photoelectrically transfers the optical beam to generate a focus error signal by an astigmatism method and supplies the focus error signal to the signal processing circuit 5 as the control signal. The first light receiving element 52 generates a tracking error signal by a differential push pull method from the three optical beams including the zero-order light and the ± first-order lights divided by the diffraction grating 44 and supplies the tracking error signal to the signal processing circuit 5 as the control signal.

The second light receiving element 53 receives the optical beam outputted from the semiconductor laser 71 and directly reflected on the polarized beam splitter 45 through the second condensing lens 37 and photoelectrically transfers the optical beam to generate an electric signal. The electric signal generated by the second light receiving element 53 is transferred to the system controller 8 so that the intensity of the optical beam outputted from the semiconductor laser 71 can be controlled to be constant. The quantity of light incident on the second light receiving element 53 may be adjusted by rotating a ½ wavelength plate not shown. In such a case, the ½ wavelength plate not shown is disposed between the collimator lens 31 and the diffraction grating 44 and an actual optical beam output is adjusted to an arbitrary value by an automatic power control (APC) circuit not shown that is incorporated in the system controller 8.

Figure 3:
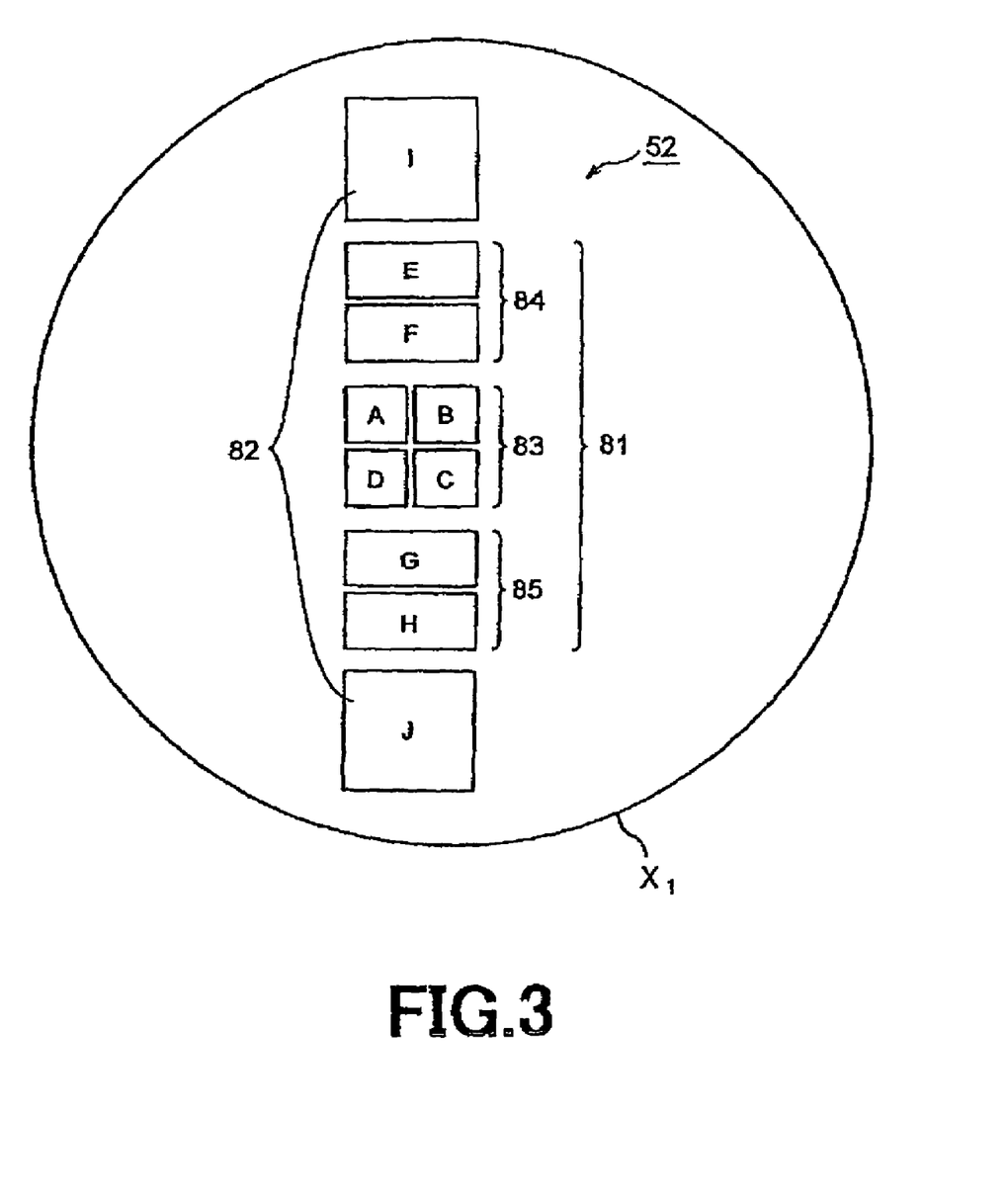
FIG. 3 is a plan view showing a first light receiving element.

Subsequently, the first light receiving element 52 will be more specifically described below.

For instance, as shown in FIG. 3, the first light receiving element 52 includes a first photodetecting part 81 for detecting the return light from any one of information recording layers 20A (20B) and a second photodetecting part 82 for detecting a stray light from the other information recording layer 20B (20A).

The first photodetecting part 81 includes one quarter photodetecting element 83 and two binary light receiving elements 84 and 85. The quarter photodetecting element 83 receives the zero-order light of the optical beams divided into three by the diffraction grating 44 by four light receiving surfaces of A to D. The binary light receiving element 84 receives the first-order light of the optical beams divided by the diffraction grating 44 by two light receiving surfaces of E and F. The binary light receiving element 85 receives the remaining first-order light of the optical beams divided by the diffraction grating 44 by two light receiving surfaces of G and H. The focus error signal and the tracking error signal are generated in accordance with the electric signal photoelectrically transferred in each of the light receiving surfaces A to H.

The second photodetecting part 82 includes one or more light receiving surfaces disposed in the vicinity of the first photodetecting part 81. In FIG. 3, an example is shown in which the second photodetecting part 82 is composed of two light receiving surfaces I and J provided in the vicinity of the binary light receiving elements 84 and 85 and having the same area as that of the binary light receiving elements 84 and 85. However, the second photodetecting part is not limited to this example, and may be composed of any number of light receiving surfaces not smaller than one in the periphery of the first photodetecting part 81. The light receiving surfaces I and J in the second photodetecting part 82 may be provided to be flush with the light receiving surfaces A to H, respectively or may be provided on surfaces with a step from each other.

Figure 4:
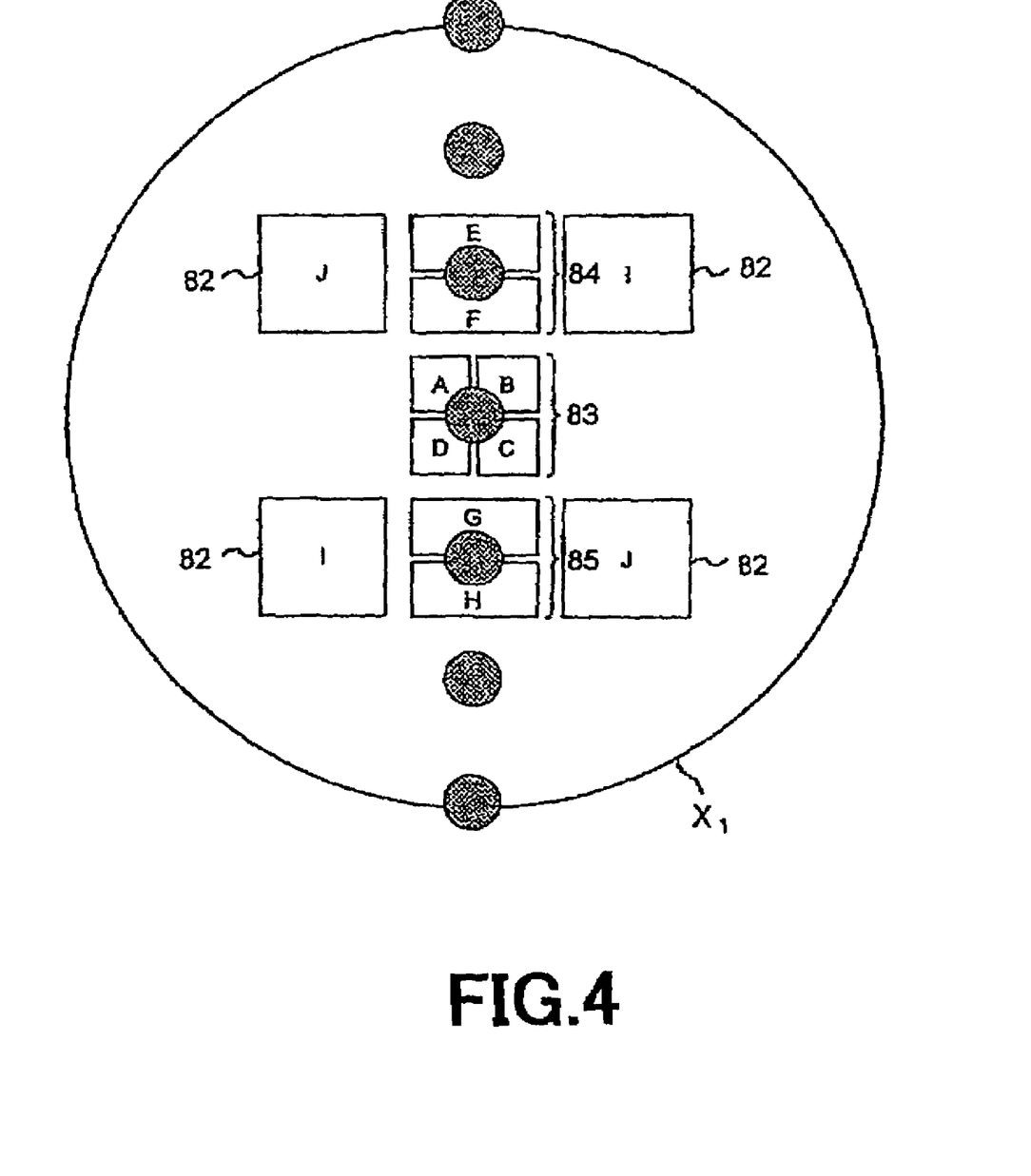
FIG. 4 is a plan view showing another example of the first light receiving element.

In this connection, the stray light is applied within a range shown by a circle $X_1$ in the first light receiving element 52 shown in FIG. 3. Accordingly, when a position where the second photodetecting part 82 is formed is located within the range irradiated with the stray light, the second photodetecting part 82 may be located at any position. For instance, as shown in FIG. 4, when spots by the optical beam as a higher-order diffracted light divided by the diffraction grating 44 are formed in the form of a row on the first light receiving element 52, the light receiving surfaces I and J in the second photodetecting part 82 may be provided at positions where the detection of the spots by the higher-order diffracted light by the second photodetecting part 82 can be avoided.

Figure 5:
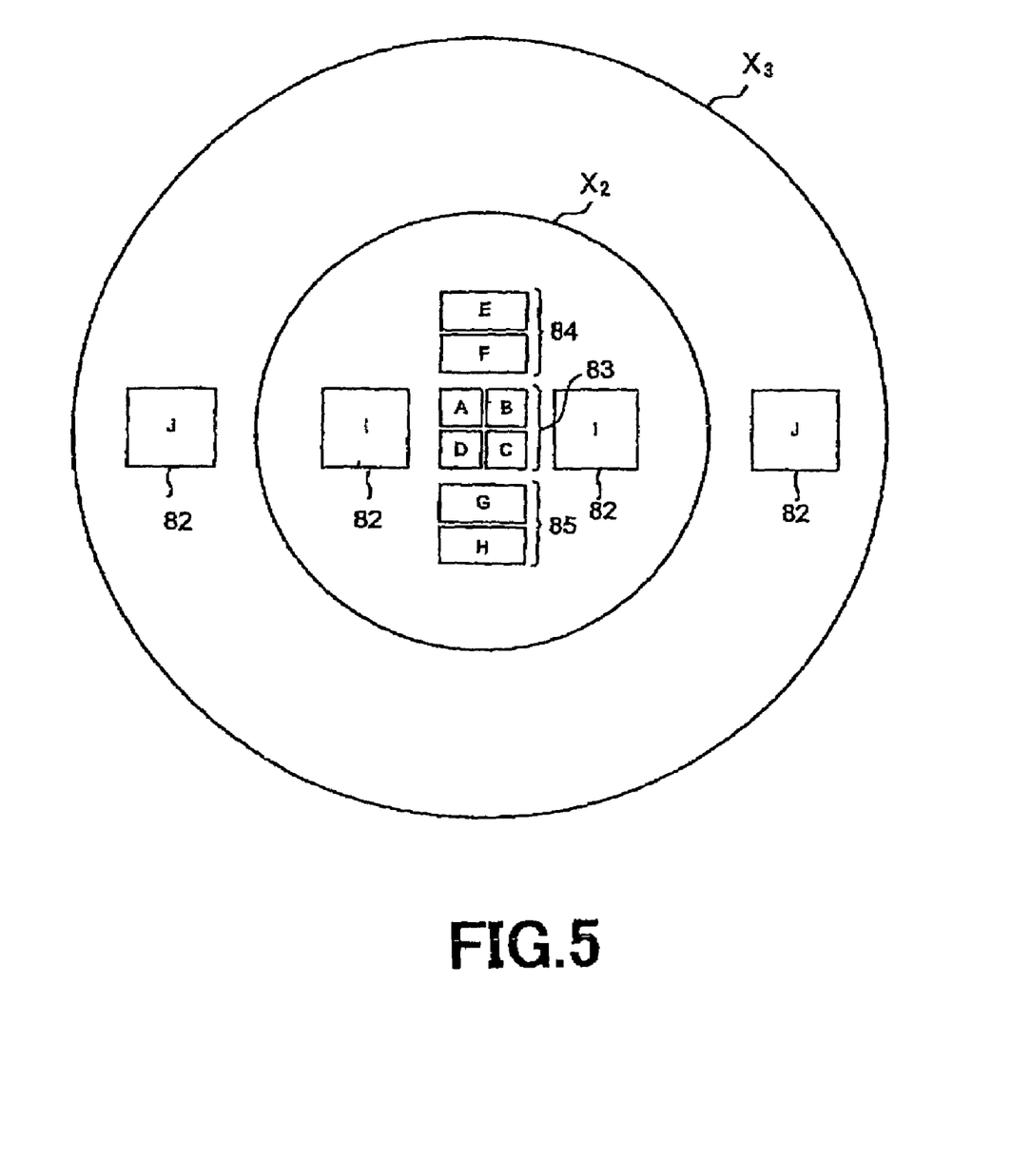
FIG. 5 is a plan view showing a state that the size of a stray light is identified by the first light receiving element.

Further, when the optical disc 2 has three or more information recording layers laminated in the direction of thickness, a range of the stray light formed on the light receiving element 52 is gradually widened from the layer close to the objective lens 34 to the layer separate from the objective lens as shown in FIG. 5. A range formed by the stray light from the information recording layers adjacent to each other shows a range designated by $X_2$ in FIG. 5. A range formed by the stray light from the information recording layer separate by two layers shows a range designated by $X_3$ in FIG. 5. Consequently, positions where the light receiving surfaces I and J of the second photodetecting part 82 are formed on the first light receiving element 52 are changed according to from which layer the stray light is detected, the stray lights can be individually detected.

A plurality of positions where the light receiving surfaces I and J of the second photodetecting part 82 are formed are provided from a central position in the first light receiving element 52 to an outer side as shown in FIG. 5. Thus, the size of the stray light formed on the first light receiving element 52 can be identified. Therefore, the kind of the disc can be determined from the size of the identified stray light. For instance, when a great stray light is detected in an optical system in which, for instance, a CD (Compact disc) is supposed, the kind of the disc can be decided to be a DVD (Digital Versatile Disc) or a BD (Blue Ray Disc). Further, since the size of the formed stray light is different depending on the thickness of each layer laminated on the optical disc 2, the thickness of each layer of the optical disc 2 can be detected on the basis of the size of the stray light identified through the second photodetecting part 82.

For instance, in the optical system in which the CD is supposed, a phenomenon may be employed that when the BD having a small space between layers is operated, a great stray light is incident on the light receiving surfaces I and J of the second photodetecting part 82 in a light receiving element 52 for receiving the light of a side spot so that the quantity of light ratio of a main to a side greatly collapses to discriminate that the disc is not the CD.

In this connection, the stray light to be detected by the second photodetecting part 82 is detected on the basis of a below-described mechanism when the optical beam is applied to the optical disc 2 on which two or more information recording layers are laminated.

Figure 6A:
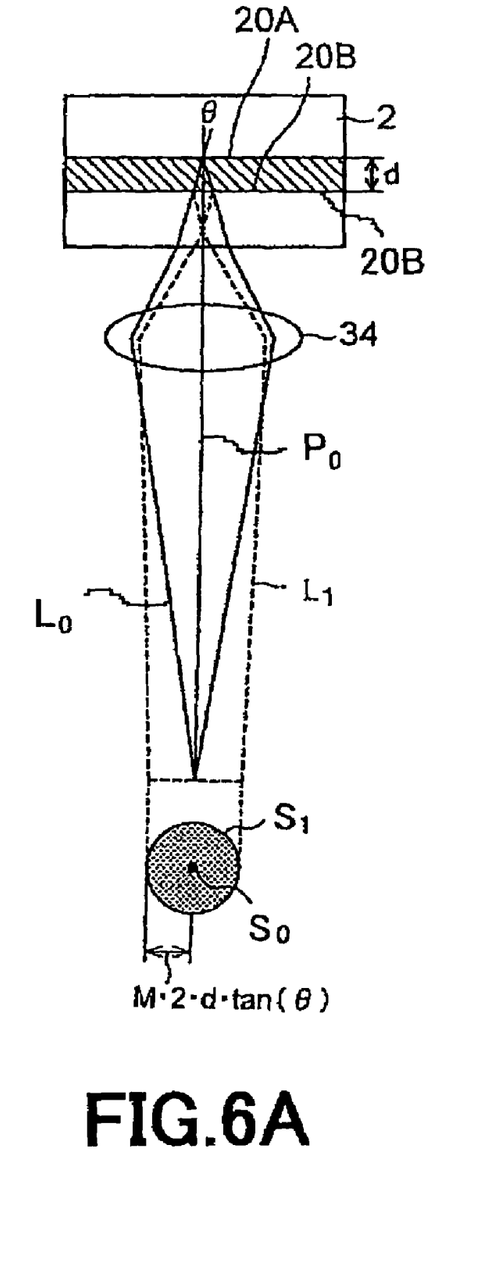
FIG. 6A is a side view showing a state that one information recording layer of the optical disc on which the information recording layers are sequentially laminated throughout two layers is irradiated with an optical beam.
Figure 6B:
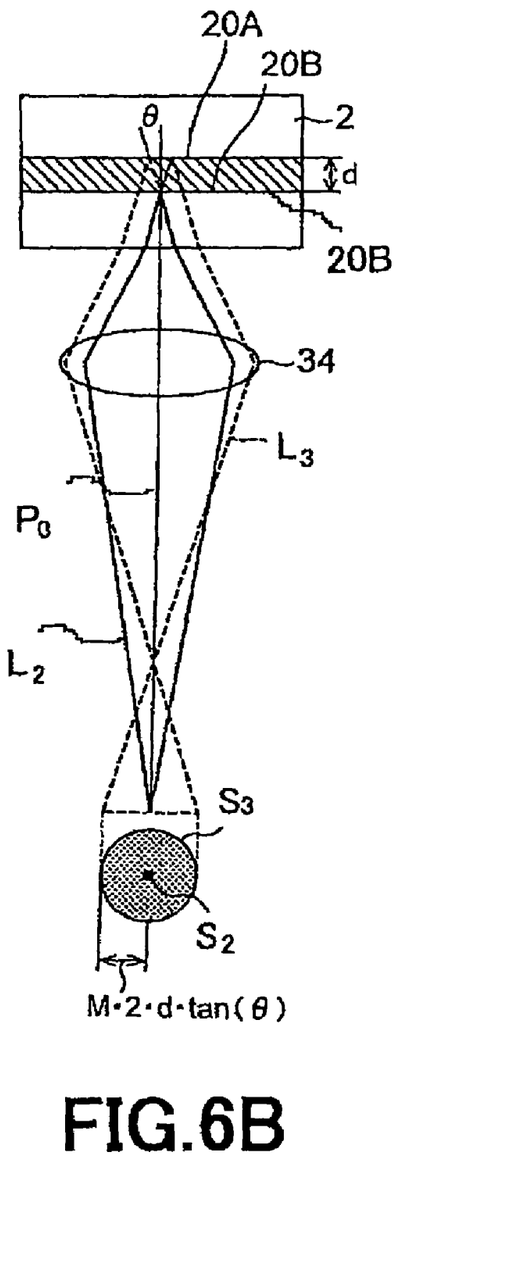
FIG. 6B is a side view showing a state that the other information recording layer is irradiated with the optical beam.

FIGS. 6A and 6B show a case in which the optical beam is applied to the optical disc 2 on which two layers of the information recording layer 20A and the information recording layer 20B are sequentially laminated.

As shown in FIG. 6A, the focal point of the optical beam by the objective lens 34 is allowed to focus on one information recording layer 20A located in a side remote from the objective lens 34, a part of the optical beam is reflected by the information recording layer 20B located in a side near to the objective lens 34. The reflected light forms a stray light $L_1$ described above and is guided to the first light receiving element 52 via a path shown by a dotted line. As a result, on the first light receiving element 52, a light spot $S_0$ by the return light $L_0$ reflected on the information recording layer 20A and a light spot $S_1$ by the stray light $L_1$ are formed.

Further, as shown in FIG. 6B, when the focal point of the optical beam by the objective lens 34 is allowed to focus on the other information recording layer 20B located in the side near to the objective lens 34, a part of the optical beam reaches one information recording layer 20A and is reflected to become a stray light $L_3$. The stray light $L_3$ is guided to the first light receiving element 52 via a path shown by a dotted line. As a result, on the first light receiving element 52, a light spot $S_2$ by the return light $L_2$ reflected on the information recording layer 20B and a light spot $S_3$ by the stray light $L_3$ are formed.

In such a way, when the optical disc 2 having two or more information recording layers laminated is irradiated with the optical beam, even if the focal point of the optical beam is allowed to focus on any of the information recording layers, the light spots $S_1$ and $S_3$ by the stray lights $L_1$ and $L_3$ are formed on the first light receiving element 52.

The stray light is generated in accordance with the above-described mechanism only when the optical disc 2 on which two or more information layers are laminated is irradiated with the optical beam. Even when the optical beam is applied to the optical disc 2 composed only of a single layer of the information recording layer, the stray light is not generated.

Accordingly, when the stray light can be detected by the second photodetecting part 82 in the first light receiving element 52, it can be discriminated that the two or more information recording layers are laminated on the optical disc 2. When the stray light cannot be detected by the second photodetecting part 82, it can be discriminated that the optical disc 2 is composed of a single layer of the information recording layer.

In the optical pick-up 4 to which the present invention is applied, the above-described second photodetecting part 82 is provided at a position where the light spots $S_1$ and $S_3$ by the stray light can be caught in the first light receiving element 52, so tat the stray light can be detected.

The second photodetecting part 82 may be provided inside the light spots formed by the stray lights from any of the information recording layers. Thus, even when the focal point of the optical beam is allowed to focus on any of the information recording layers in the optical disc 2, the stray light from other information recording layers can be always detected.

Here, when the reflection factor of the information recording layer 20A is equal to that of the information recording layer 20B, the intensity ratio η of the stray light in the optical disc 2 can be expressed by a following formula (1).

$$\eta = |S/(M^2 \cdot \pi \cdot (2d \cdot \tan\theta)^2)| \qquad (1)$$

In this formula (1), S designates an area of the second photodetecting part 82 in the first light receiving element 52. M designates a magnification of a detecting optical system from the optical disc 2 to the first light receiving element 52. d designates a distance between layers of the information recording layer 20A and the information recording layer 20B. θ indicates an angle formed by an optical axis $P_0$ and the beam of an outermost edge of the condensed optical beam in the optical disc 2 as shown in FIGS. 6A and 6B. In this connection, assuming that in a combination of the objective lens 34 having a numerical aperture of 0.85 and the optical disc 2 having a protective layer 20E with a refractive index of 1.6, θ is 32°, the second photodetecting part 82 in the first light receiving element 52 is composed of two square light receiving surfaces having 150 μm square, M has 20 times, and d is 25 μm, η=1.8%.

That is, when the optical disc 2 is composed of a single information recording layer, a light output detected by the second photodetecting part 82 is 0. As compared therewith, when the optical disc 2 is composed of the plurality of information recording layers, the light output of the stray light corresponding to the above-described η can be detected by the second photodetecting part 82.

Figure 7A:
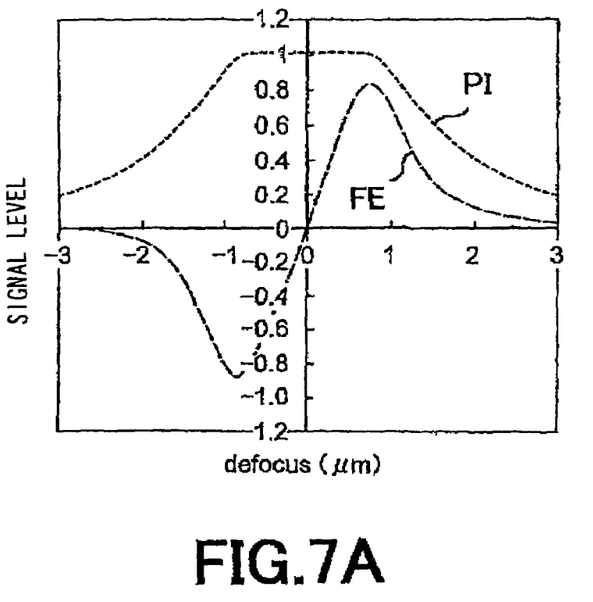
FIG. 7A is a characteristic view showing a focus error signal FE formed by an astigmatism method from an optical disc on which a single information recording layer is formed, a sum signal PI based on the sum total of return lights and a stray light signal X based on a stray light.
Figure 7B:
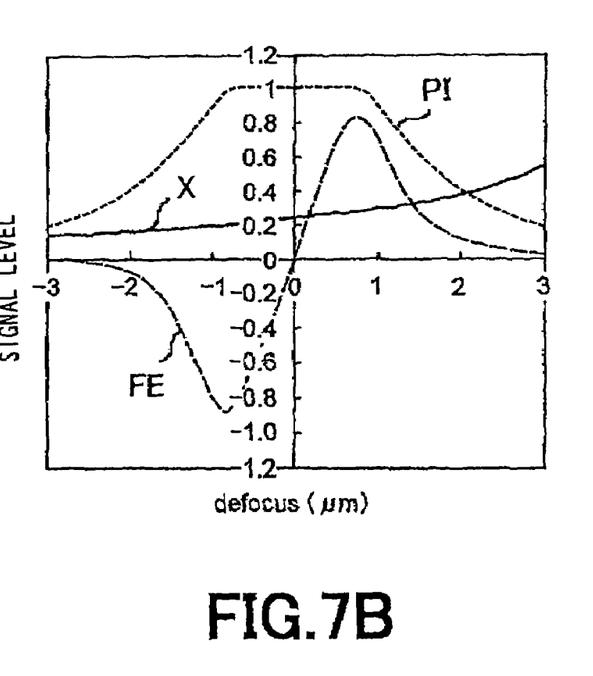
FIG. 7B is a characteristic view showing a focus error signal FE formed by the astigmatism method from an optical disc on which two single information recording layers are formed, a sum signal PI based on the sum total of return lights and a stray light signal X based on a stray light.

FIGS. 7A and 7B show results by comparing focus error signals FE generated by an astigmatism method, sum signals PI based on the sum total of the return light by the optical disc 2 received by the first light receiving element 52 and stray light signals X based on the stray light detected by the second photodetecting part 82 between the optical disc 2 on which a single information recording layer is formed and the optical disc 2 on which the two layers of the information recording layers are formed.

A stray light level α corresponding to the intensity of the stray light is expressed by a following formula (2) from the sum signal PI in the vicinity of 0 cross of the focus error signal FE and the stray light signal X.

$$\alpha = X/PI \approx \eta \quad (2)$$

The magnitude of the stray light level α is identified so that the number of the information recording layers piled on the optical disc 2 can be discriminated.

As the distance d between the layers increases, the radiuses of the light spots $S_1$ and $S_3$ by the stray lights $L_1$ and $L_3$ become larger, and accordingly, the intensity ratio η of the stray light in the optical disc 2 decreases. Accordingly, the range of the magnitude of the stray light level α to be identified may be optimally set depending on the kind of the optical disc 2 to be recorded and reproduced.

Further, another stray light based on other factors is generated in an optical system forming the optical pick-up 4 in addition to the stray light from the optical disc 2. In this case, even when the optical beam is applied to the optical disc 2 on which only the single information recording layer is formed, another stray light is detected by the second photodetecting part 82. As a result, α is not equal 0.

In such a case, an identifying level β is set corresponding to the intensity of light of another stray light and the magnitude of the stray light level α to the identifying level β is identified to discriminate the number of the information recording layers laminated on the optical disc 2. When the number of the information recording layers is discriminated, in case a following formula (3) is established, the information recording layer may be discriminated to be composed of the single layer. When a formula (4) is established, the information recording layer may be discriminated to be composed of a plurality of layers.

$$\alpha < \beta \quad (3)$$

$$\alpha \geq \beta \quad (4)$$

Thus, even when another stray light based on other factors is generated in the optical system forming the optical pick-up 4, since the identifying level corresponding thereto is preset, only the stray light from the optical disc can be selectively detected without receiving the effect of another stray light.

Further, when the number of the information recording layers laminated on the optical disc 2 is discriminated, the stray light signal X may not be standardized by the sum signal PI as shown in the formula (2) and the identifying level β may be set to the size itself of the stray light signal X to identify the size of the stray light signal X to the identifying level β.

In this case, when a below-described formula (5) is established, the information recording layer may be discriminated to be composed of the single layer. When a formula (6) is established, the information recording layer may be discriminated to be composed of the plurality of layers.

$$X < \beta \quad (5)$$

$$X \geq \beta \quad (6)$$

Thus, a complicated operation flow for standardizing the stray light signal X can be saved.

The system controller 8 detects the stray light level α or the stray light signal X before a focus servo control followed by a recording and reproducing process to discriminate the number of the information recording layers laminated on the optical disc 2 in accordance with the above-described formulas (3) to (6) and control the optical pick-up 4 in accordance with the discriminated number of the information recording layers.

When the system controller 8 discriminates that the information recording layer is composed of a single layer, the system controller 8 controls the optical pick-up 4 so as to obtain a light output meeting the recording and reproducing process of the optical disc 2 having the single layer such as a CD-R. On the other hand, when the system controller 8 discriminates that the information recording layer is composed of the plurality of layers, the system controller 8 controls the optical pick-up 4 so as to obtain a light output meeting the recording and reproducing process of the optical disc 2 having a plurality of layers such as a Blu-Ray Disc. That is, since the optical disc 2 has different reflection characteristics depending on the number of the information recording layers laminated thereon, the output of the optical beam outputted from the semiconductor laser 71 can be optimized in accordance with the discriminated number of the information recording layers.

Namely, in the optical disc apparatus to which the present invention is applied, when the number of the information recording layers laminated in the direction of thickness of the optical disc 2 to be recorded or reproduced, a focus control does not need to be performed once for performing a reading operation of a discriminating signal recorded on the optical disc 2 and the number of the information recording layers can be discriminated only by outputting the optical beam from the semiconductor laser 71 and detecting the stray light level α or the stray light signal X by the second photodetecting part 82.

In the optical disc apparatus 1 to which the present invention is applied, since the reading operation of the discriminating signal does not need to be performed during a recording or a reproducing operation, the number of the information recording layers can be extremely rapidly and easily discriminated, and the optical pick-up 4 can be controlled according thereto.

Further, in the optical disc apparatus 1 to which the present invention is applied, before the recording or reproducing process is performed, in other words, before the focus control followed by the recording and reproducing process is performed, the number of the information recording layers laminated on the optical disc 2 can be discriminated. Thus, since the optical pick-up 4 is controlled to be optimum in accordance with the number of the information recording layers laminated on the optical disc 2 upon performing the focus servo control, the recording and reproducing operation can be rapidly started.

Further, when the above-described usual discriminating signal is read, the intensity of light of the optical beam emitted from the optical pick-up 4 needs to be compared with the intensity of light for performing an optimum recording and reproducing process and reset to a lower value. However, in the optical disc apparatus 1 to which the present invention is applied, since the discriminating signal does not need to be read, the intensity of light of the optical beam does not need to be reset to the lower value and the recording/reproducing process can be started in a more stable way.

In the above-described embodiment, a case is described as an example that the first light receiving element 52 is mounted for detecting the return light in accordance with the differential push pull method in the structure of the optical pick-up 4. However, the present invention is not limited to such a case, and a light receiving element for generating a tracking error signal in accordance with other method such as a three-beam method may be used in place thereof.

Further, in the above-described embodiment, an example is described that the light receiving surface of the second photodetecting part 82 has the same area as that of the binary light receiving elements 84 and 85. However, the present invention is not limited to such a case and the light receiving surface may be formed to have an arbitrary area with the same effects.

Further, when the optical disc 2 using the blue laser beam having the wavelength of 405 nm for a recording and reproducing process is employed as the recording medium, the objective lens 34 having the numerical aperture of 0.85 is used. As the objective lens 34, any of a monocular structure or a two-group structure may be used.

Still further, in the optical disc apparatus 1 to which the present invention is applied, an example is shown that the liquid crystal element 33 is used as a correcting element of the spherical aberration generated due to an error of the thickness of the protective layer 20E in the optical disc 2. However, the present invention is not limited to this example and other spherical aberration correcting element such as an expander lens may be used in place thereof.

Still further, the optical disc apparatus 1 to which the present invention is applied is not limited to the apparatus using the optical disc 2 for recording and reproducing the information signal by using the blue laser beam having the wavelength of 405 nm. The optical disc apparatus may be applied to such an apparatus as to record and reproduce any other disc type recording media, for instance, a CD-R (Compact Disc-Recordable), a DVD-R (Digital Versatile Disc/Digital Video Disc-Recordable) or a DVD-RW (DVD-Rewritable), etc.

Furthermore, the optical disc apparatus 1 to which the present invention is applied may be any of an apparatus that can both record and reproduce the information signal, a recording apparatus for merely recording the information signal or a reproducing apparatus for merely reproducing the information signal recorded on the optical disc 2.

It is to be understood by a person with ordinary skill in the art that the present invention is not limited to the above-described embodiment with reference to the drawings and various changes, substitutions or equivalence thereto may be made without departing the attached claims and the gist thereof.

The invention claimed is:

1. An optical disc apparatus having an optical pick-up that applies an optical beam to an optical disc on which one or more information recording layers are laminated in the direction of thickness through an objective lens and detects a reflected light from one of the information recording layers laminated on the optical disc, said optical disc apparatus comprising:

a photodetecting unit having a first photodetecting part for detecting the reflected light from the one information recording layer and a second photodetecting part composed of one or more light receiving surfaces for detecting whether or not there is a stray light from other information recording layers and the quantity of light thereof; and a control unit for discriminating the number of the information recording layers laminated on the optical disc on the basis of the intensity of the stray light and/or the distribution of the intensity detected by the second photodetecting part in the photodetecting unit and changing the setting of the optical pick-up in accordance with the discriminated number of the information recording layers, wherein the control unit discriminates the kind of the optical disc on the basis of the presence or absence of the stray light from other information recording layers detected by the second photodetecting part in the photodetecting unit and the quantity of light thereof.

2. The optical disc apparatus according to claim 1, wherein in the kind of the optical disc, it is discriminated whether or not the information recording layer is composed of one layer.

3. The optical disc apparatus according to claim 1, wherein in the kind of the optical disc, the number of the information recording layers is discriminated.

4. The optical disc apparatus according to claim 1, wherein in the kind of the optical disc, a space from the information recording layer to other information recording layers is discriminated.

5. The optical disc apparatus according to claim 1, wherein in the kind of the optical disc, an optical disc format is discriminated.

6. The optical disc apparatus according to claim 1, wherein the setting of the optical pick-up is changed in accordance with the discriminated results.

7. The optical disc apparatus according to claim 6, wherein in changing the setting, the setting of the power of a recording and/or reproducing light outputted from the optical pick-up is changed.

8. The optical disc apparatus according to claim 6, wherein in changing the setting, the setting of the amount of spherical aberration of light outputted from the optical pick-up is changed.

9. The optical disc apparatus according to claim 6, wherein in changing the setting, the setting of the wavelength of the light outputted from the optical pick-up is changed.

10. The optical disc apparatus according to claim 6, wherein the settings are changed on the basis of the reflected light detected by the first photodetecting part in the photodetecting unit before a distance between a focal point of the optical beam by the objective lens and the one information recording layer is focusing-controlled.

11. The optical disc apparatus according to claim 1, wherein under a state in which the distance between the focal point of the optical beam by the objective lens and the one information recording layer is located within a range where the reflected light from the one information recording layer can be detected by the first photodetecting part, the second photodetecting part in the photodetecting unit is located within a range upon which a light spot formed by the stray light from other information recording layers is incident for the purpose of detection.

12. The optical disc apparatus according to claim 11, wherein the second photodetecting part in the photodetecting unit forms a part of the first photodetecting part in the photodetecting unit.

13. The optical disc apparatus according to claim 1, wherein the first photodetecting part in the photodetecting unit includes at least two or more groups of light receiving parts adapted to respectively receive at least two or more light spots.

14. The optical disc apparatus according to claim 13, wherein at least two or more light spots are greatly different in quantity of light ratio.

15. The optical disc apparatus according to claim 14, the first photodetecting part in the photodetecting unit is disposed so as to receive a zero-order diffracted light and a first-order diffracted light corresponding to a tracking control signal of a differential push-pull system.

16. The optical disc apparatus according to claim 13, wherein the first photodetecting part in the photodetecting unit is disposed so as to receive a spot for detecting a push pull signal from one beam on an information recording surface and a spot for canceling the offset of the push pull signal.

17. The optical disc apparatus according to claim 1, wherein a light receiving surface of the second photodetecting part in the photodetecting unit has the substantially same area as that of the first photodetecting part for receiving the first-order diffracted light.

18. The optical disc apparatus according to claim 1, wherein the optical pick-up applies a blue laser beam to the optical disc through the objective lens.

19. A control method for an optical pick-up that applies an optical beam to an optical disc on which one or more information recording layers are laminated in the direction of thickness through an objective lens and detects a reflected light from one of the information recording layers laminated on the optical disc, said control method comprising the steps of:

- detecting whether or not there is a stray light and the quantity of light thereof by a light receiving element including a first photodetecting part for detecting the reflected light from the one information recording layer and a second photodetecting part composed of one or more light receiving surfaces for detecting whether or not there is the stray light from other information recording layers and the quantity of light thereof;
- discriminating the number of the information recording layers laminated on the optical disc on the basis of the intensity of the stray light and/or the distribution of the intensity detected by the second photodetecting part in the photodetecting unit;
- changing the setting of the optical pick-up in accordance with the discriminated number of the information recording layers; and
- discriminating the kind of the optical disc on the basis of the presence or absence of the stray light from other information recording layers detected by the second photodetecting part in the photodetecting unit and the quantity of light thereof.

20. A discriminating method for an optical disc in which an optical beam is applied to an optical disc on which one or more information recording layers are laminated in the direction of thickness through an objective lens and a reflected light from one of the information recording layers laminated on the optical disc is detected to discriminate the kind of the optical disc, said discriminating method comprising the steps of:

- detecting whether or not there is a stray light and the quantity of light thereof by a light receiving element including a first photodetecting part for detecting the reflected light from the one information recording layer and a second photodetecting part composed of one or more light receiving surfaces for detecting whether or not there is the stray light from other information recording layers and the quantity of light thereof;
- discriminating the number of the information recording layers laminated on the optical disc on the basis of the intensity of the stray light and/or the distribution of the intensity detected by the second photodetecting part in the photodetecting unit;
- changing the setting of the optical pick-up in accordance with the discriminated number of the information recording layers; and
- discriminating the kind of the optical disc on the basis of the presence or absence of the stray light from other information recording layers detected by the second photodetecting part in the photodetecting unit and the quantity of light thereof.

* * * * *